(12) United States Patent
Utsugi

(10) Patent No.: US 8,155,477 B2
(45) Date of Patent: Apr. 10, 2012

(54) IMAGE PROCESSING METHOD, CARRIER MEDIUM CARRYING IMAGE PROCESSING PROGRAM, IMAGE PROCESSING APPARATUS, AND IMAGING APPARATUS

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 801 days.

(21) Appl. No.: 12/289,253

(22) Filed: Oct. 23, 2008

(65) Prior Publication Data

US 2009/0074323 A1 Mar. 19, 2009

Related U.S. Application Data

(63) Continuation of application No. PCT/JP2007/000393, filed on Apr. 11, 2007.

(30) Foreign Application Priority Data

May 1, 2006 (JP) ................................. 2006-127757

(51) Int. Cl.
*G06K 9/36* (2006.01)
(52) U.S. Cl. ....................................... 382/275
(58) Field of Classification Search .................. 382/254, 382/266, 286, 287, 275; 348/187, 188; 356/124
See application file for complete search history.

(56) References Cited

U.S. PATENT DOCUMENTS

| | | | | |
|---|---|---|---|---|
| 7,280,706 B2 * | 10/2007 | Wu et al. | .................. | 382/275 |
| 2005/0083405 A1 | 4/2005 | Imoto et al. | .................. | 384/148 |
| 2005/0083427 A1 | 4/2005 | Imoto | .................. | 348/335 |

FOREIGN PATENT DOCUMENTS

| | | |
|---|---|---|
| JP | A-05-110926 | 4/1993 |
| JP | A-06-121318 | 4/1994 |
| JP | A-2000-011166 | 1/2000 |
| JP | A-2005-110207 | 4/2005 |

OTHER PUBLICATIONS

Kuniyoshi et al., "Active Stereo Vision System with Foveated Wide Angle Lenses," *Proceedings of the Asian Conference on Computer Vision*, pp. 191-200, Dec. 5, 1995.

Devernay et al., "Straight lines have to be straight," *Machine Vision and Applications*, vol. 13, No. 1, pp. 14-24, Aug. 2001.

Pers et al., "Nonparametric, Model-Based Radial Lens Distortion Correction Using Tilted Camera Assumption," *Proceedings of the Computer Vision Winter Workshop*, pp. 286-295, 2002.

(Continued)

*Primary Examiner* — Andrew W Johns
(74) *Attorney, Agent, or Firm* — Oliff & Berridge, PLC

(57) ABSTRACT

A proposition is to provide an image processing method, a carrier medium carrying an image processing program, an image processing apparatus, and an imaging apparatus capable of attaining line reproducibility and magnification distortion reduction in a well-balanced manner in an image. The image processing method is an image processing method for performing predetermined geometric transformation processing ($h(\theta)$) on an image to be processed, in which the predetermined geometric transformation processing ($h(\theta)$) includes geometric transformation processing for magnification distortion reduction ($h=\alpha \tan(\theta/2)^{(\kappa p)}$) that reduces discrepancy between circumferential magnification and radial magnification of the image to be processed, and at least one parameter ($\theta p$) that determines the strength or content of the predetermined geometric transformation processing ($h=\alpha \tan(\theta/2)^{(\kappa p)}$) is set according to the structure of the image to be processed.

20 Claims, 7 Drawing Sheets

OTHER PUBLICATIONS

Zelnik-Manor et al., "Squaring the Circle in Panoramas," *Computer Vision 2005, ICCV 2005, Proceedings of the Tenth IEEE International Conference on Computer Vision*, vol. 2, pp. 1292-1299, Jan. 1, 2005.

Zorin et al., "Correction of Geometric Perceptual Distortions in Pictures," *Computer Graphics and Proceedings*, pp. 257-264, Los Angeles, California, USA, Aug. 6-11, 1995.

European Search Report issued in Application No. 07 73 7050; Dated Apr. 4, 2011.

* cited by examiner

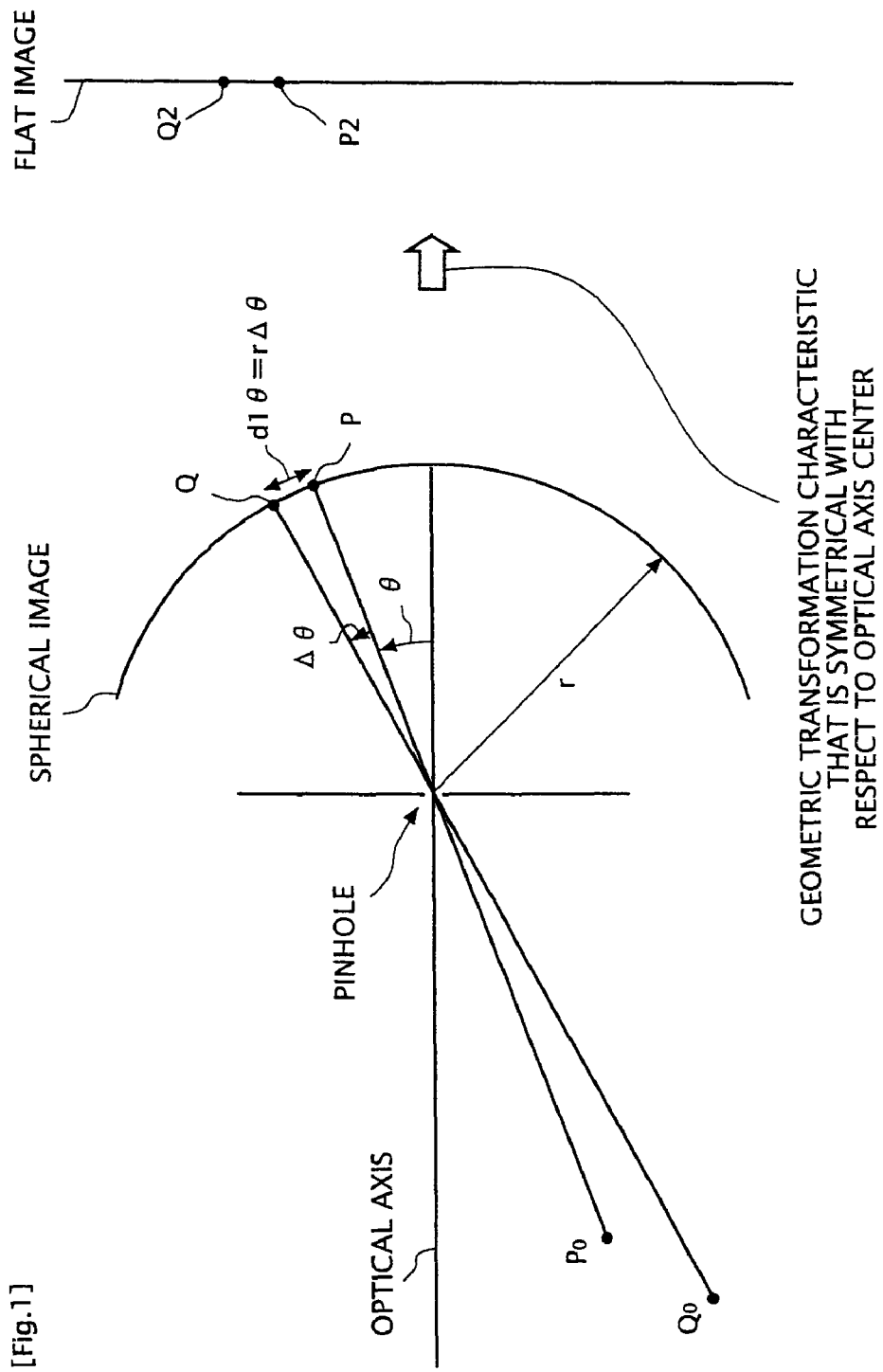

[Fig.2]
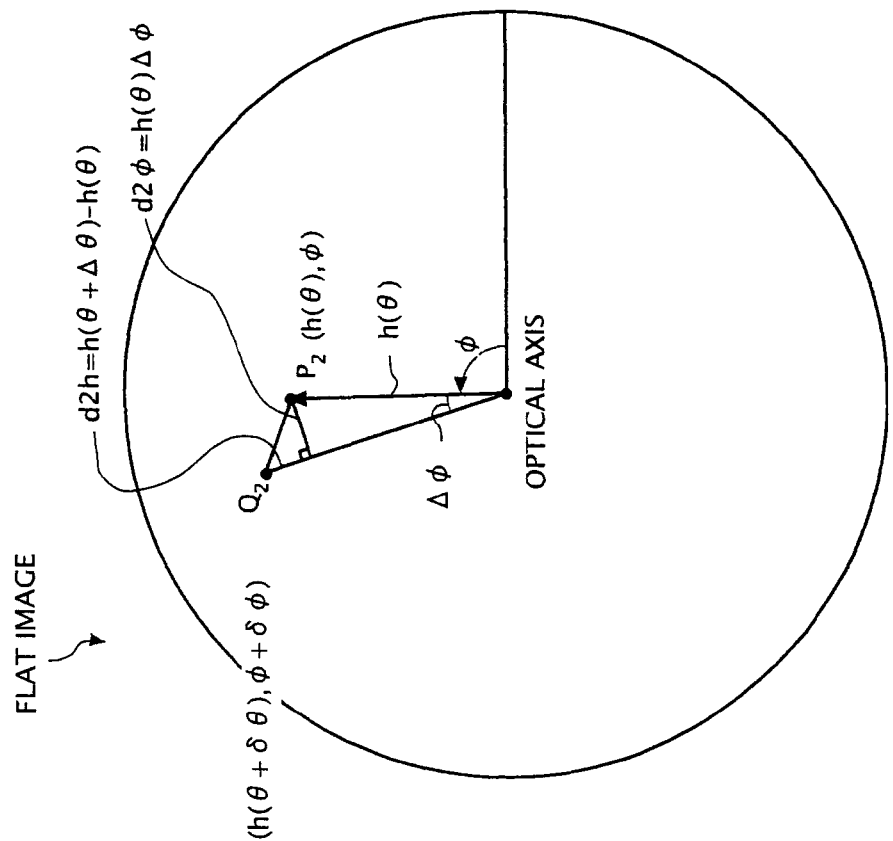
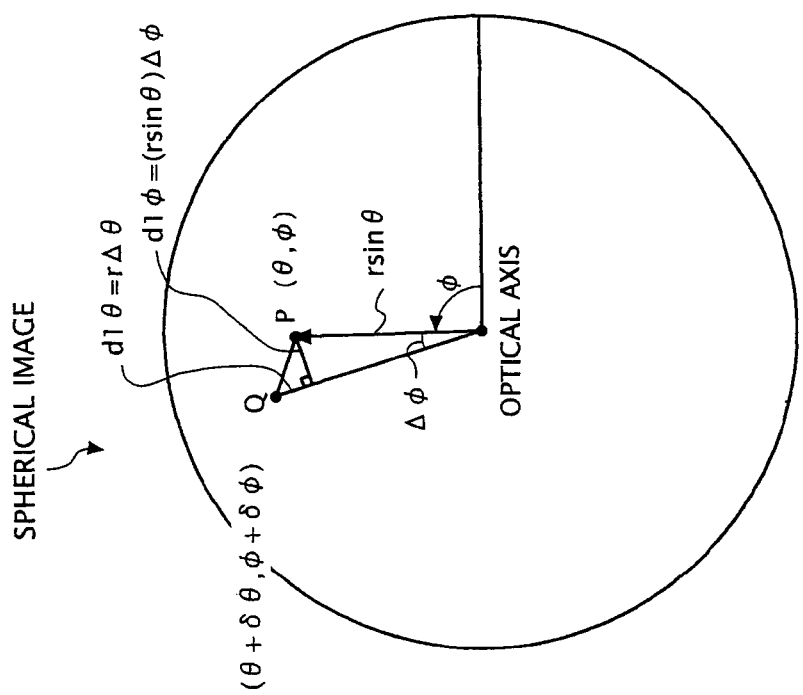

[Fig.3]
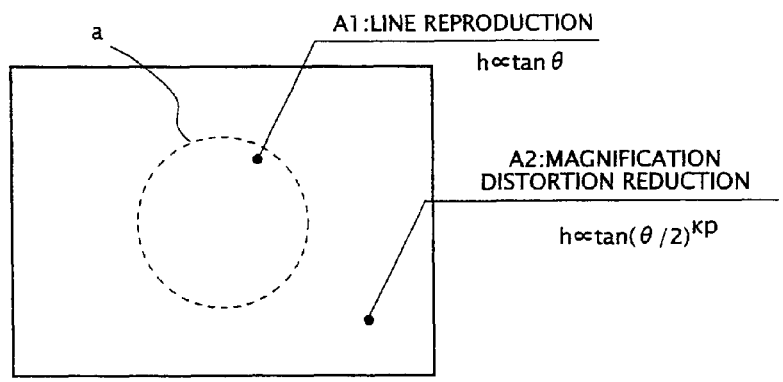
[Fig.4]
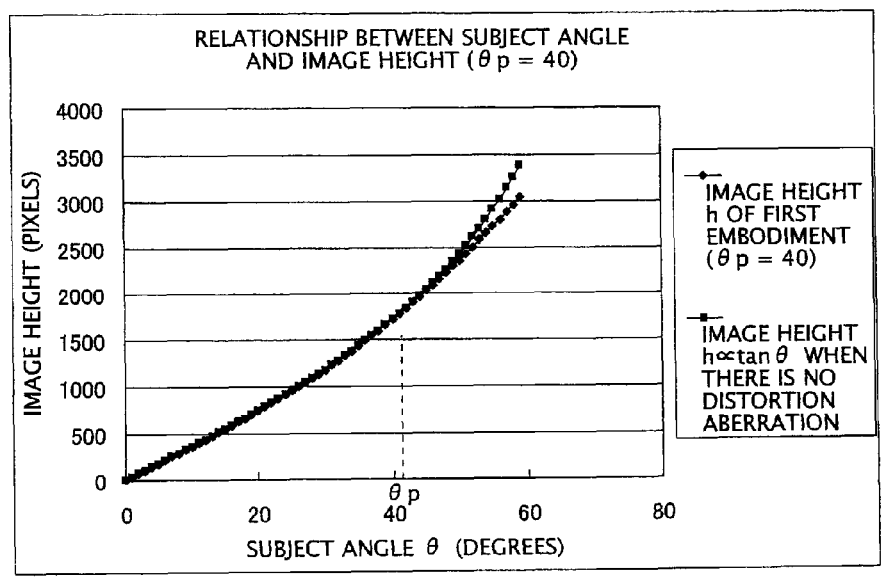

[Fig.5]
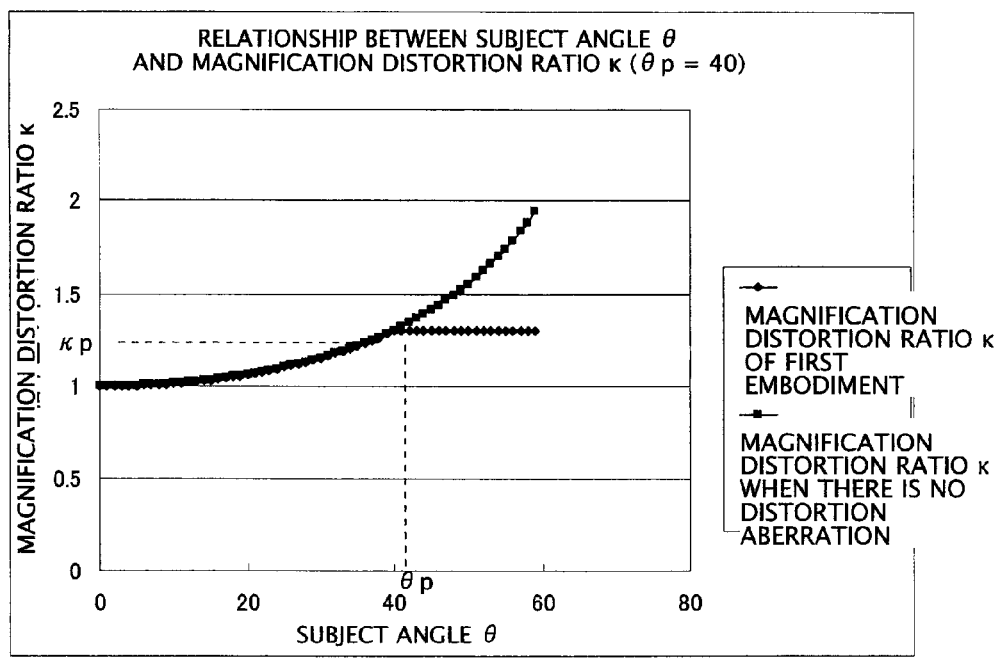

[Fig.6]
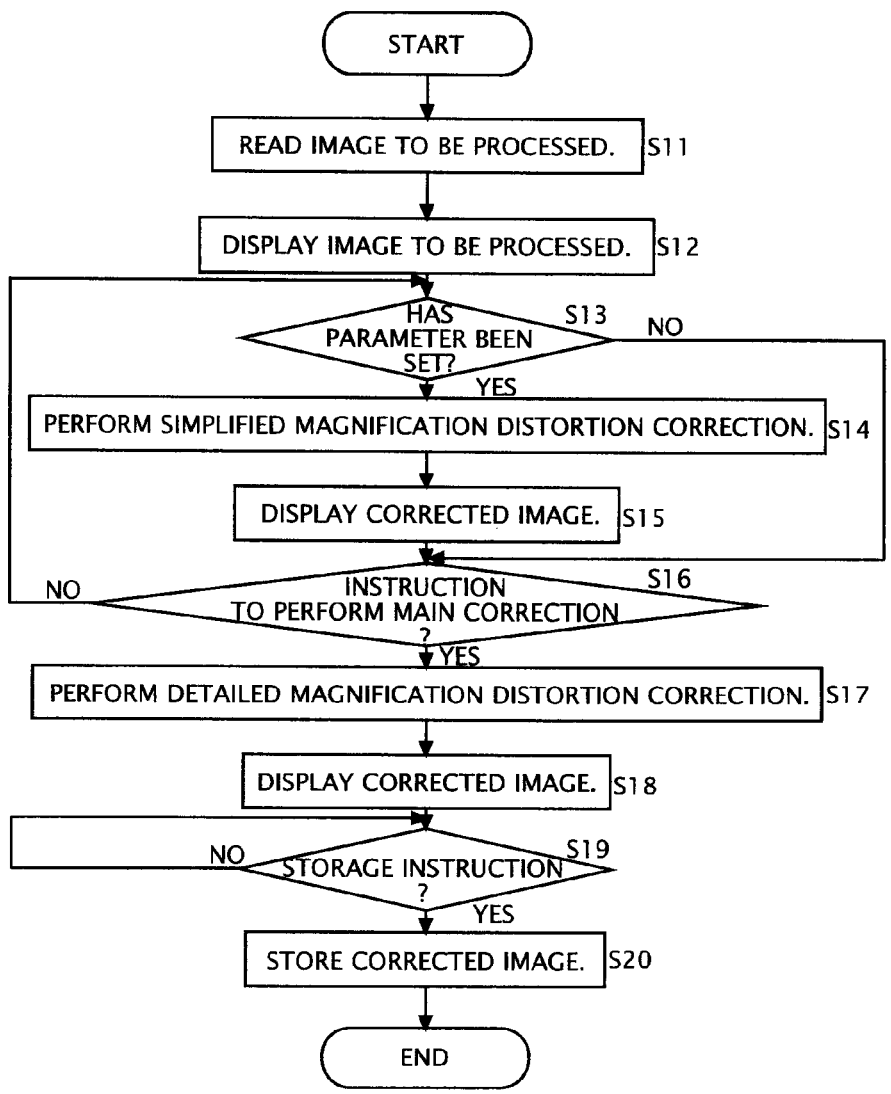

[Fig.7]
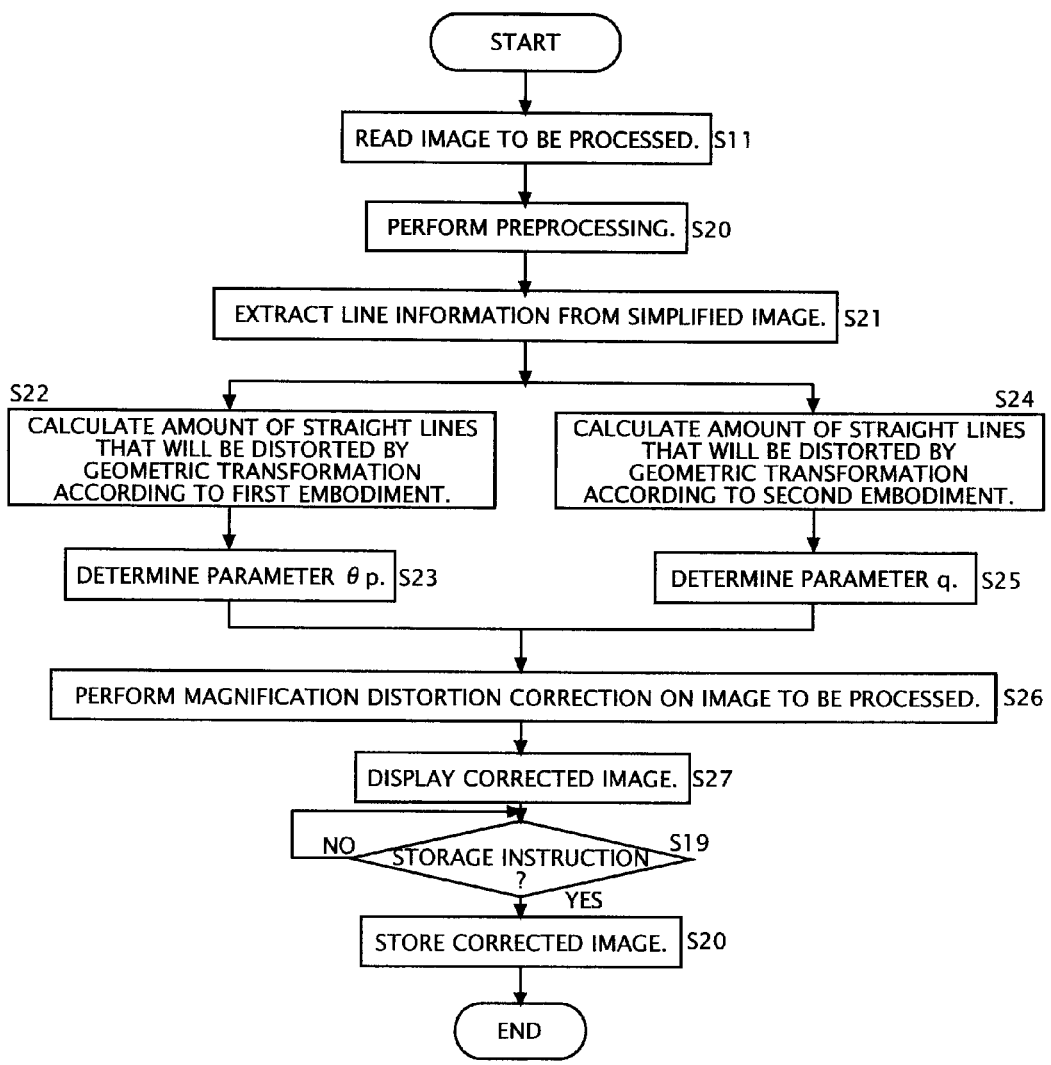

[Fig.8A]
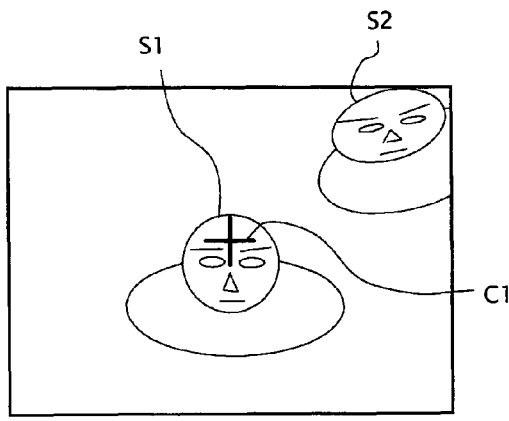
⬇ SPECIFICATION OF MAJOR SUBJECT POSITION
[Fig.8B]
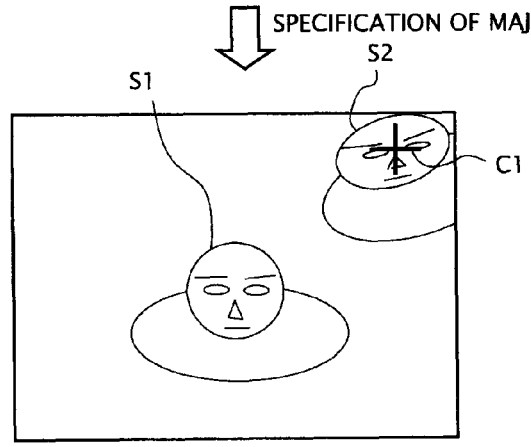
⬇ GEOMETRIC TRANSFORMATION PROCESSING
[Fig.8C]
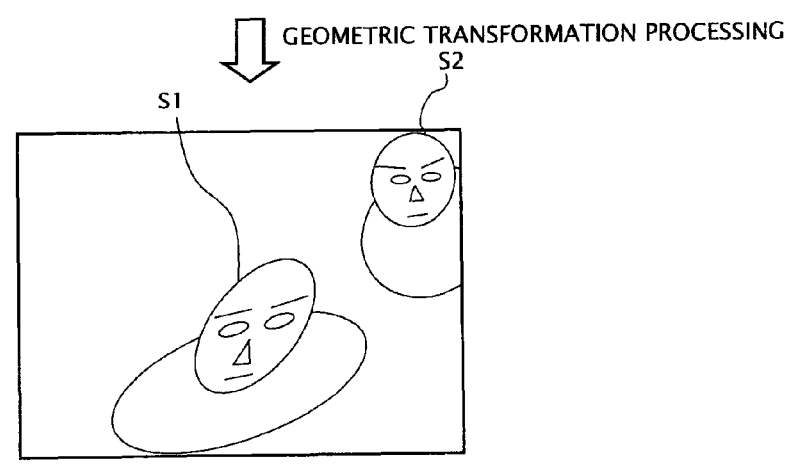

IMAGE PROCESSING METHOD, CARRIER MEDIUM CARRYING IMAGE PROCESSING PROGRAM, IMAGE PROCESSING APPARATUS, AND IMAGING APPARATUS

CROSS-REFERENCE TO RELATED APPLICATION

This is a Continuation of International Application No. PCT/JP2007/000393, filed Apr. 11, 2007, designating the U.S., in which the International Application claims a priority date of May 1, 2006, based on prior filed Japanese Patent Application No. 2006-127757, the entire contents of which are incorporated herein by reference.

BACKGROUND

1. Field

The present application relates to an image processing method, a carrier medium carrying an image processing program, an image processing apparatus, and an imaging apparatus for performing geometric transformation processing on a shot image by an optical system.

2. Description of the Related Art

Shooting lenses of general cameras are designed so that an image that is similar to a subject plane assumed is formed on an imaging plane. Therefore, when attention is paid to a subject existing at a local position in a shot image, the magnification in the radial direction (i.e., the direction from the optical axis center toward the image periphery) is larger than that in the circumferential direction (i.e., the direction around the optical axis center). In this specification, in the following, the discrepancy between the radial magnification and the circumferential magnification of a subject existing at a local position in an image will be called "magnification distortion."

Unlike the distortion aberration, the magnification aberration occurs even if a shooting lens is free of aberrations. And the magnification aberration corresponds to differences in impressions between a subject as observed by the naked eyes and its shot image through a shooting lens. For example, when an observer gazes at a subject that is not located at the center when observing a relatively wide field with the naked eyes, the axes of sighting of the eyeballs of the observer are inclined without the observer's realizing it. On the other hand, the optical axis is fixed when the same field is shot through a shooting lens. Therefore, in a shot image through the shooting lens, a subject that is located at a peripheral position looks thicker in the radial direction. This is magnification distortion and is more remarkable as the position goes outward in a wide-angle image.

The geometric transformation characteristic of a projection algorithm that is free of distortion aberration, that is, a projection algorithm that is high in line reproducibility, is given by the following Inequality (A), where h is the image height and θ is the subject angle. This geometric transformation characteristic causes magnification distortion though it is high in line reproducibility.

$$h(\theta) \propto \tan\theta \quad \text{(A)}$$

On the other hand, among projection algorithms of fish-eye lenses etc. is a stereographic projection algorithm that does not cause magnification distortion. The geometric transformation characteristic of the stereographic projection algorithm is given by the following Inequality, where h is the image height and θ is the subject angle. This geometric transformation characteristic is low in line reproducibility though it does not cause magnification distortion.

$$h(\theta) \propto \tan(\theta/2) \quad \text{(B)}$$

In view of the above, a geometric characteristic that lies midway between Inequalities (A) and (B) is proposed in Patent Document 1 (Japanese Unexamined Patent Application Publication No. 2005-110207). This in-between geometric characteristic is given by the following Inequality (C). In Inequality (C), P is a predetermined value that satisfies a relationship 1<P<4.

$$h(\theta) \propto \tan(\theta/P) \quad \text{(C)}$$

Conventionally, it has been considered that both of magnification distortion reduction and high reproducibility can be attained by performing geometric transformation processing on a shot image by a camera according to this geometric transformation characteristic.

However, the geometric transformation characteristic of Inequality (C) does not always make it possible to express the entire area of an image satisfactorily and noticeable line distortion or magnification distortion may occur depending on the position in an image.

SUMMARY

A proposition is to solve the above problems and thereby provide an image processing method, a carrier medium carrying an image processing program, an image processing apparatus, and an imaging apparatus capable of attaining line reproducibility and magnification distortion reduction in a well-balanced manner in an image.

An image processing method according to the invention is an image processing method which performs predetermined geometric transformation processing on an image to be processed, wherein the predetermined geometric transformation processing includes geometric transformation processing for magnification distortion reduction that reduces discrepancy between circumferential magnification and radial magnification of the image to be processed, and at least one parameter that determines strength or content of the geometric transformation processing for magnification distortion reduction is set according to structure of the image to be processed.

The geometric transformation processing for magnification distortion reduction may be such as to act on a peripheral area of the image to be processed.

The predetermined geometric transformation processing may include geometric transformation processing for magnification distortion reduction that acts on a peripheral area of the image to be processed and geometric transformation processing for line reproduction that acts on a central area of the image to be processed.

A position of a boundary between the peripheral area and the central area may be set as the parameter.

It is desirable that at least one of h(θ), h'(θ) as derivatives of h(θ), and κ(θ) be continuous at θp, where θ is an arbitrary subject angle, θp is a subject angle corresponding to the boundary position, h(θ) is an image height, as a function of the subject angle θ, obtained after execution of the predetermined geometric transformation processing, and κ(θ) is a ratio between the circumferential magnification and the radial magnification at the subject angle θ.

The image processing method may be such that the image to be processed has magnification distortion that is symmetrical with respect to an optical axis center, the geometric transformation processing for magnification distortion reduction has a geometric transformation characteristic that is not symmetrical with respect to the optical axis center, and strength q of the geometric transformation processing for magnification distortion reduction is set as the parameter.

It is desirable that the strength q be set in a range of 0<q<1.

It is desirable that the geometric transformation processing for magnification distortion reduction has a geometric transformation characteristic that is symmetrical with respect to a vertical line and a horizontal line that pass through the optical axis center.

The image processing method may be such as to display images obtained before and/or after execution of the predetermined geometric transformation processing to a user and to let the user set the parameter.

The image processing method may be such as to perform line detection on the image to be processed and set the parameter according to its result.

The geometric transformation processing for magnification distortion reduction may be geometric transformation processing which converts the image to be processed into an image that would be obtained when the same subject were shot by a virtual optical system whose optical axis is located at a position that is deviated from a center of the image to be processed, and the optical axis position of the virtual optical system may be set as the parameter.

The position of the optical axis of the virtual optical system may be set at a main subject position in the image to be processed.

The image processing method may be such as to display the image to be processed to a user and to let the user specify the main subject position.

The image processing method may be such as to perform image recognition on the image to be processed and to detect the main subject position based on its result.

The predetermined geometric transformation processing may include geometric transformation processing for distortion aberration reduction that reduces distortion aberration of the image to be processed in addition to the geometric transformation processing for magnification distortion reduction, and pixel interpolation processing may be performed at one time on the image that has been subjected to both of the geometric transformation processing for magnification distortion reduction and the geometric transformation processing for distortion aberration reduction.

A carrier medium carrying an image processing program according to the invention causes a computer to execute the image processing method according to any of the image processing methods according to the invention.

An image processing apparatus according to the invention performs any of the image processing methods according to the invention.

An imaging apparatus according to the invention includes any of the image processing apparatus according to the invention.

BRIEF DESCRIPTION OF THE DRAWINGS

FIG. 1 illustrates magnification distortion that is symmetrical with respect to the optical axis center.

FIG. 2 are front views, as viewed along the optical axis, of a spherical image and a flat image.

FIG. 3 illustrates a geometric transformation characteristic according to a first embodiment.

FIG. 4 shows a relationship between the subject angle $\theta$ and the image height $h_2$ of the geometric transformation characteristic according to the first embodiment.

FIG. 5 shows a relationship between the subject angle $\theta$ and the magnification distortion ratio $\kappa$ of the geometric transformation characteristic according to the first embodiment.

FIG. 6 is an operation flowchart of a computer according to a third embodiment.

FIG. 7 is an operation flowchart of a computer according to a fourth embodiment.

FIG. 8A to FIG. 8C illustrate a procedure of a fifth embodiment.

DETAILED DESCRIPTION OF THE EMBODIMENTS

[First Embodiment]

A first embodiment will be described. This embodiment is an embodiment of an image processing method for performing magnification distortion correction on an image to be processed. In this embodiment, it is assumed that the image to be processed is a shot image through a general shooting lens having a small distortion aberration.

In the magnification distortion correction according to the embodiment, a pixel value of a pixel having coordinates (x, y) in an image to be processed is moved to a pixel value of a pixel having coordinates ($x_2$, $y_2$) by geometric transformation processing that consists of the following <operation 1> to <operation 4> and pixel interpolation processing is performed.

<Operation 1>

An image height h corresponding to coordinates (x, y) is calculated according to the following equation:

[Formula 1]

$$h = \sqrt{(x-cx)^2 + (y-cy)^2} \quad (1)$$

In Equation (1), (cx, cy) are coordinates of the optical axis center in the image to be processed.

<Operation 2>

A subject angle $\theta$ corresponding to the image height h is calculated according to the following equation:

[Formula 2]

$$\theta = \arctan\left(\frac{d_{max}}{f} \frac{h}{h_{max}}\right) \quad (2)$$

In Equation (2), $d_{max}$ is a maximum image height as converted into a length in the image to be processed, f is the focal length of the shooting lens, and $h_{max}$ is a maximum image height as converted into the number of pixels in the image to be processed.

<Operation 3>

The subject angle $\theta$ is converted into an image height $h_2$ according to the following equations:

[Formulae 3]

$$\begin{cases} h_2(\theta) = \begin{cases} C \dfrac{h_{max}}{d_{max}} f \tan\theta & \text{if } \theta \leq \theta p \\ C_2 \dfrac{h_{max}}{d_{max}} f \left(\tan\dfrac{\theta}{2}\right)^{\kappa p} & \text{if } \theta > \theta p \end{cases} \\ \kappa p = \dfrac{1}{\cos\theta p} \\ C_2 = C\tan\theta p \times \left(\tan\dfrac{\theta p}{2}\right)^{-\kappa p} \end{cases} \quad (3)$$

In Equation (3), C is the variable magnification and is set at a proper value of about 1 to 1.2, for example, so as to avoid excessive image reduction. θp is a threshold value and is set according to the structure of the image to be processed. When an image to be processed has a general structure, it is appropriate to set θp at about 40°.

<Operation 4>

Coordinates $(x_2, y_2)$ corresponding to the image height $h_2$ are calculated according to the following equations:

[Formulae 4]

$$x_2 = cx + (x - cx) \times \frac{h_2}{h} \quad (4x)$$

$$y_2 = cy + (y - cy) \times \frac{h_2}{h} \quad (4y)$$

(Advantages of First Embodiment)

First, a description will be made of magnification distortion that is symmetrical with respect to the optical axis center. An image to be processed of this embodiment and an image that has been subjected to the magnification distortion correction according to the embodiment can be regarded as having magnification distortion that is symmetrical with respect to the optical axis center.

As shown in FIG. 1, assume a case of forming a subject image onto a sphere image by a pinhole camera. In this case, the distance between points P and Q in the spherical image is proportional to a view angle between points $P_0$ and $Q_0$ that is obtained when the subject is seen from the pinhole. That is, the spherical image has no magnification distortion. However, in actual cameras, since a subject is reproduced as a flat image by a geometric characteristic that is symmetrical with respect to the optical axis center, magnification distortion occurs that is symmetrical with respect to the optical axis center. Therefore, the magnification distortion of the flat image can be calculated by considering local variations in image magnification that occur when the spherical image is projected onto the flat image.

FIG. 2 are front views, as viewed along the optical axis, of the spherical image and the flat image.

It is assumed that the feature point P in the spherical image is projected to a feature point $P_2$ in the flat image, and that the feature point Q which is separated from the feature point P by a very small distance is projected to a feature point $Q_2$ in the flat image.

The coordinates of the feature point P are determined by an angle (subject angle) θ that is formed by the optical axis and the straight line connecting the pinhole and the feature point P (see FIG. 1) and an angle (circumferential angle) φ of the straight line around the optical axis (see FIG. 2). The coordinates of the feature point P are thus represented by (θ, φ).

Likewise, the coordinates of the feature point Q are determined by a subject angle (θ+Δθ) and a circumferential angle (φ+Δφ). The coordinates of the feature point Q are thus represented by (θ+Δθ, φ++Δθ).

On the other hand, the coordinates of the feature point $P_2$ are represented by an image height and a circumferential angle in the flat image. The image height of the feature point $P_2$ is represented by a function h(θ) which is a function of only the subject angle θ of the feature point P, and the circumferential angle of the feature point $P_2$ is the same as the circumferential angle φ of the feature point P (because the geometric transformation characteristic is symmetrical with respect to the optical axis center). The coordinates of the feature point $P_2$ are thus represented by (h(θ), φ).

Likewise, the coordinates of the feature point $Q_2$ are represented by an image height and a circumferential angle in the flat image. The image height of the feature point $Q_2$ is represented by a function h(θ+Δθ) which is a function of the subject angle (θ+Δθ) of the feature point Q, and the circumferential angle of the feature point $Q_2$ is the same as the circumferential angle (φ+Δφ) of the feature point Q. The coordinates of the feature point $Q_2$ are thus represented by (h(θ+Δθ), φ+Δφ).

As shown in the left-hand part of FIG. 2, if the distance between the feature points P and Q in the spherical image is approximated by a straight line, the circumferential component d1φ and the radial component d1θ of the distance are given by the following equations, respectively, using the distance r from the spherical image to the pinhole (see FIG. 1).

[Formulae 5]

$$d1\phi = (r \sin \theta)\Delta\phi \quad (5\phi)$$

$$d1\theta = r\Delta\theta \quad (5\theta)$$

As shown in the right-hand part of FIG. 2, the circumferential component d2φ and the radial component d2h of the distance between the feature points $P_2$ and $Q_2$ in the flat image are given by the following equations, respectively:

[Formulae 6]

$$d2\phi = h(\theta)\Delta\phi \quad (6\phi)$$

$$d2h = h(\theta + \Delta\theta) - h(\theta) \quad (6h)$$

$$= \frac{dh(\theta)}{d\theta}\Delta\theta$$

Therefore, the circumferential magnification kφ and the radial magnification kh in the flat image are given by the following equations, respectively:

[Formulae 7]

$$k\phi = \frac{d2\phi}{d1\phi} = \frac{h(\theta)}{r\sin\theta} \quad (7\phi)$$

$$kh = \frac{d2h}{d1\theta} = \frac{1}{r}\frac{dh(\theta)}{d\theta} \quad (7h)$$

Therefore, the magnification distortion ratio κ in the flat image is given by the following equation:

[Formula 8]

$$\kappa \equiv \frac{kh}{k\phi} = \frac{\sin\theta \frac{dh(\theta)}{d\theta}}{h(\theta)} \quad (8)$$

For example, in the image to be processed of the embodiment, the subject is elongated in the radial direction in an area where the magnification distortion ratio κ is larger than 1. In the distortion aberration correction for the image to be processed, it is necessary to make the magnification distortion ratio κ fall within an allowable range (e.g., smaller than or equal to 1.3) in the entire area of the image to be processed. In particular, the magnification distortion ratio κ tends to be large in a peripheral area of the image to be processed (i.e., in an area where the subject angle θ is large). It is important to reduce the magnification distortion ratio κ in the peripheral area.

Next, the geometric transformation characteristic according to the embodiment will be considered with reference to FIG. 3.

In the geometric transformation characteristic according to the embodiment, a geometric transformation characteristic that causes the image height $h_2$ to be proportional to tan θ, that is, a geometric transformation characteristic that is high in line reproducibility, is employed in an area where the subject angle θ is smaller than or equal to the threshold value θp (i.e., a central area A1 in FIG. 3).

However, geometric transformation characteristics that are high in line reproducibility generate magnification distortion. A magnification distortion ratio that is caused by the geometric transformation characteristic that is high in line reproducibility is calculated as 1/(cos θ) by substituting $h(θ) \propto \tan θ$ into Equation (8). That is, the geometric transformation characteristic that is high in line reproducibility generates larger magnification distortion as the subject angle θ increases.

Furthermore, in the geometric transformation characteristic according to the embodiment, a geometric transformation characteristic that causes the image height $h_2$ to be proportional to tan $(θ/2)^{\wedge}(κp)$, that is, a geometric transformation characteristic that reduces the magnification distortion, is employed in an area where the subject angle θ is larger than the threshold value θp (i.e., a peripheral area A2 in FIG. 3).

A magnification distortion ratio that is caused by the geometric transformation characteristic that reduces the magnification distortion is calculated as κp=1/(cos θp) by substituting $h(θ) \propto \tan (θ/2)^{\wedge}(κp)$ into Equation (8). That is, the geometric transformation characteristic that reduces the magnification distortion keeps the magnification distortion the same as that at θ=θp irrespective of the subject angle θ.

FIG. 4 shows a relationship between the subject angle θ and the image height $h_2$ of the geometric transformation characteristic according to the embodiment. FIG. 5 shows a relationship between the subject angle θ and the magnification distortion ratio κ of the geometric transformation characteristic according to the embodiment. In FIGS. 4 and 5, the threshold value θp is set at 40° and data of a geometric transformation characteristic $h_2(θ) \propto \tan θ$ are shown additionally for comparison.

As shown in FIG. 4, the content of the geometric transformation characteristic according to the embodiment is switched at the boundary between the area of θ≦θp (central area A1) and the area of θp<θ (peripheral area A2). As a result of the switching, as shown in FIG. 5, the magnification distortion ratio κ increases gradually in the area of θ≦θp (central area A1) and is kept at a constant value κp in the area of θp<θ (peripheral area A2). The magnification distortion ratio κ is continuous at θ=θp, and also in the range of θ≦θp it is kept to the value κp taken in the area of θp<θ (peripheral area A2).

As described above, in the magnification distortion correction according to the embodiment, as shown in FIG. 3, importance is attached to the line reproducibility in the central area A1 of the image to be processed and to the magnification distortion reduction in the peripheral area A2.

In the embodiment, the magnification distortion can fall within the allowable range in the entire area merely by setting the threshold value θp so that the magnification distortion falls within the allowable range in the peripheral area A2 by taking the structure etc. of the image to be processed into consideration.

Incidentally, it is desirable that a default threshold value θp be set at about 40°, for example. In this case, the magnification distortion ratio κ is reduced to about 1.3 or less.

In particular, if the threshold value θp is set so that the magnification distortion in the peripheral area A2 becomes the maximum value of the allowable range, the deterioration of the line reproducibility in the peripheral area A2 can be reduced to a minimum necessary level and hence the line reproducibility and the magnification distortion reduction are balanced well in the entire area.

Furthermore, in the geometric transformation processing according to the embodiment, h(θ) which represents the relationship between the image height h and the subject angle θ, h'(θ) as the derivative of h(θ), and the magnification distortion ratio κ(θ) each are continuous at θ=θp where the geometric transformation characteristic is switched, the central area A1 and the peripheral area A2 are connected to each other smoothly and naturally at the boundary a.

(Supplements to First Embodiment)

The image to be processed of the embodiment is a shot image through a general shooting lens having a small distortion aberration. However, images taken through other kinds of shooting lenses may be processed.

For example, a shot image through a fish-eye lens may be an image to be processed of the embodiment. However, in this case, it is necessary to use a geometric transformation characteristic (i.e., an equation representing a relationship between the image height h and the subject angle θ) that is specific to the fish-eye lens in place of Equation (2) in the above-described <operation 2>. Taking an image (image to be processed) through a fish-eye lens is suitable for monitoring camera systems etc. because a very wide angle, natural image is obtained.

A shot image through a shooting lens having a large distortion aberration may be an image to be processed of the embodiment. However, in this case, it is necessary to acquire distortion aberration information of the shooting lens in advance and to insert, between the above-described <operation 2> and <operation 3>, a geometric transformation operation of converting the image height h based on the distortion aberration information (i.e., geometric transformation processing for distortion aberration correction).

In the magnification distortion correction according to the embodiment, the pixel interpolation processing is performed on an image that has been subjected to the geometric transformation processing. The pixel interpolation processing is processing of interpolating pixel values at integer coordinate positions using pixel values at decimal coordinate positions that have been subjected to the geometric transformation. Such a technique as cubic interpolation can be applied to this processing.

Where plural kinds of geometric transformation processing are combined to the magnification distortion correction according to the embodiment, it is desirable that the pixel interpolation processing be performed at one time after execution of all of the plural kinds of geometric transformation processing.

In the geometric transformation processing according to the embodiment, setting the variable magnification C at 1 in Equations (3) means that the geometric transformation processing for the central area A1 of the image to be processed is omitted. Depending on the structure of an image to be processed, the geometric transformation processing need not be performed for the central area A1. This setting makes it possible to shorten the processing time of the magnification distortion correction by omitting useless calculations.

The image to be processed of the embodiment is a shot image through an actual shooting lens. However, images taken through lenses that are not an actual shooting lens may be processed as long as a subject is projected by a geometric transformation processing that is symmetrical with respect to the image center.

For example, an image that is obtained by cutting out part of a shot image through a fish-eye lens and performing geometric transformation processing on a resulting image so as to eliminate distortion aberration may be an image to be processed of the embodiment. Since such an image has magnification distortion that is similar to that of a shot image through a general shooting lens having a small distortion aberration, the embodiment can be applied to it. That is, the term "optical axis center" as used in the embodiment encompasses a virtual optical axis center of such an image.

The magnification distortion correction according to the embodiment can be performed in image processing apparatus capable of capturing an image, such as a computer, an image storage unit, and a printer. For example, where it is performed in a computer, it is appropriate to prepare a program for performing the magnification distortion correction according to the embodiment in advance and install it in the computer. Alternatively, similar processing may be performed on a mobile apparatus having an imaging function, such as a digital camera.

The magnification distortion correction according to the embodiment requires such information as a focal length f of a shooting lens and a maximum image height length $d_{max}$. Where the magnification distortion correction according to the embodiment is performed by an image processing apparatus such as a computer, a storage unit, or a printer, it is appropriate for a user to input those pieces of information to the image processing apparatus.

Alternatively, where adjunct information is attached to an image file of an image to be processed (where such a file format as EXIF is employed), an image processing apparatus may automatically recognize a focal length f of a shooting lens, a maximum image height length $d_{max}$, etc. based on the adjunct information and a separately provided database.

[Second Embodiment]

A second embodiment will be described. This embodiment is also an embodiment of an image processing method in which an image to be processed is an image having magnification distortion that is symmetrical with respect to the optical axis center and magnification distortion correction is performed on it. Differences from the first embodiment will be described mainly.

The differences reside in the details of the geometric transformation processing. In the geometric transformation processing according to the embodiment, a pixel value of a pixel having coordinates (x, y) in an image to be processed is moved to a pixel value of a pixel having coordinates $(x_2, y_2)$ that are given by the following Equations (9):

[Formulae 9]

$$\begin{cases} f(x) = \int_0^x \frac{1}{\kappa(h)} dh \\ g(x) = (1-q) \times x + q \times f(x) \\ x_2 = cx + C \times g(x - cx) \\ y_2 = cy + C \times g(y - cy) \end{cases} \quad (9)$$

In Equations (9), $\kappa(h)$ is the magnification distortion ratio at the image height h in the image to be processed and (cx, cy) are coordinates of the optical axis center in the image to be processed. And C is the variable magnification and is set at a proper value of about 1 to 1.2, for example, so as to avoid excessive image reduction.

Parameter q represents the strength of the geometric transformation processing and is set according to the structure of the image to be processed. The strength q is set in a range of $0 \leq q \leq 1$ and desirably in a range of $0 \leq q \leq 0.7$.

(Advantages of Second Embodiment)

Since the geometric transformation characteristic according to the embodiment is symmetrical with respect to the vertical line and the horizontal line that pass through the optical axis center, high line reproducibility is obtained in the vertical direction and the horizontal direction of an image to be processed. Furthermore, this geometric transformation characteristic reduces the magnification distortion ratio κ at individual positions in the vertical direction and the horizontal direction with respect to the optical axis center.

With such a geometric transformation characteristic, no straight lines in the vertical direction or the horizontal direction are distorted in the entire area of an image to be processed and the magnification distortion of a subject located over, under, to the right of, or to the left of the optical axis center is reduced.

However, the geometric transformation processing according to the embodiment is low in line reproducibility in oblique directions. Therefore, if its strength q is high, oblique lines in an image to be processed are distorted unnaturally.

In view of this, in the embodiment, the strength q of the geometric transformation processing is set at a proper value that is smaller than 1 taking the structure etc. of an image to be processed into consideration. As a result, the line reproducibility and the magnification distortion reduction can be well balanced in the entire area of the image to be processed.

Incidentally, it is desirable that the default value of the strength q of the geometric transformation processing according to the embodiment be set at about 0.4, for example. To prevent unnatural distortion of oblique lines, the strength q needs to be set at least smaller than or equal to 0.7. However, in general, line structures of an image to be processed are in many cases extend in the vertical direction or the horizontal direction. Therefore, in many images to be processed, it is possible to set the strength q at values that are close to 1.

(Supplements to Second Embodiment)

In the geometric transformation processing characteristic according to the embodiment, the strength q of geometric transformation processing in the vertical direction (y direction) and that in the horizontal direction (x direction) have the same value. However, they may be set at different values.

The magnification distortion correction according to the embodiment can be performed in image processing apparatus capable of capturing an image, such as a computer, an image storage unit, and a printer. For example, where it is performed in a computer, it is appropriate to prepare a program for performing the magnification distortion correction according to the embodiment in advance and install it in the computer. Alternatively, similar processing may be performed on a mobile apparatus having an imaging function, such as a digital camera.

Magnification distortion correction may be performed by combining the geometric transformation processing according to this embodiment and that according to the first embodiment. This magnification distortion correction consists of an operation of performing the geometric transformation processing according to the first embodiment on an image to be processed, an operation of performing the geometric transformation processing according to this embodiment, and an operation of performing pixel interpolation processing. It is desirable that the pixel interpolation processing be performed at one time after execution of all the kinds of geometric transformation processing.

[Third Embodiment]

A third embodiment will be described. This embodiment is an embodiment of an image processing program that is suitable for a case that the magnification distortion correction according to the first embodiment is performed by a computer. This image processing program causes a computer to operate in the following manner. It is assumed that a monitor as an output device and a mouse, a keyboard, etc. as input devices are connected to the computer and serve for interfacing with a user.

FIG. 6 is an operation flowchart of the computer according to the embodiment. As shown in FIG. 6, the computer reads an image to be processed (operation S11) and sends the image to be processed to the monitor to display it (operation S12). A user can recognize the structure of the image to be processed on the monitor. The computer recognizes a focal length f of a shooting lens, a maximum image height length $d_{max}$, etc. by referring to adjunct information of an image file of the image to be processed and a separately prepared database.

The computer causes a user to set the geometric transformation parameter of the magnification distortion correction (operation S13). The geometric transformation parameter is the threshold value $\theta p$ in the above-described Equations (3). It is appropriate for the user to set the threshold value $\theta p$ small if he or she judges that importance should be attached to the magnification distortion reduction rather than the line reproducibility, and to set the threshold value $\theta p$ large if he or she judges that importance should be attached to the line reproducibility rather than the magnification distortion reduction.

When the user has set the geometric transformation parameter (in this embodiment, the threshold value $\theta p$) (operation S13: yes), the computer performs, in a simplified manner, the magnification distortion correction according to the first embodiment on the image to be processed (operation S14) and displays a corrected image (simplified image) on the monitor (operation S15). The simplified magnification distortion correction means magnification distortion correction on a size-reduced version of the image to be processed, magnification distortion correction with simplified pixel interpolation processing, or the like.

The user can judge from the simplified image on the monitor whether the geometric transformation parameter (in this embodiment, the threshold value $\theta p$) set by himself or herself is proper. If the user judges that the geometric transformation parameter is improper and sets a geometric transformation parameter (in this embodiment, a threshold value $\theta p$) (operation S16: no; operation S13: yes), operations S14 and S15 are executed again. The user can adjust the geometric transformation parameter (in this embodiment, the threshold value $\theta p$) any number of times until he or she is satisfied with a simplified image on the monitor (operations S13, S14, and S15).

Then, if the user is satisfied with a simplified image on the monitor and inputs an execution instruction to perform magnification distortion correction to the computer (operation S16: yes), the computer performs the magnification distortion correction according to the first embodiment on the image to be processed in a detailed manner (operation S17) using the currently set geometric transformation parameter (in this embodiment, the threshold value $\theta p$) and displays a corrected image (detailed image) on the monitor (Operation S18). The detailed magnification distortion correction means magnification distortion correction on a non-size-reduced version of the image to be processed.

Then, if the user inputs an image storage instruction to the computer (operation S19), the computer stores the detailed image in a nonvolatile memory such as a hard disk in a proper file format (operation S20).

(Advantages of Third Embodiment)

The image processing program according to the embodiment displays an image to be processed and a simplified image on the monitor. Therefore, a user can cause the computer to perform desired magnification distortion correction while checking the structure of the image to be processed and the effects of the magnification distortion correction. For example, the user can attach importance to the line reproducibility by setting the threshold value $\theta p$ large if the image to be processed is an image of a building and can attach importance to the magnification distortion reduction by setting the threshold value $\theta p$ small if the image to be processed is a group photograph.

In the image processing program according to the embodiment, the magnification distortion correction of operation S14 is the simplified magnification distortion correction. Therefore, operations S13, S14, and S15 are executed at high speed. Therefore, a user can check the effects of the magnification distortion correction in real time while adjusting the geometric transformation parameter (in this embodiment, the threshold value $\theta p$).

(Supplements to Third Embodiment)

In this embodiment, the magnification distortion correction according to the first embodiment is employed. Alternatively, the magnification distortion correction according to the second embodiment may be employed. In this case, the geometric transformation parameter to be set by a user is the strength q in Equations (9).

In this embodiment, the magnification distortion correction according to the first embodiment is employed. Alternatively, magnification distortion correction may be employed in which the geometric transformation processing according to the first embodiment and that according to the second embodiment are combined together (described in the "supplements to first embodiment" section. In this case, the geometric transformation parameters to be set by a user are both of the threshold value $\theta p$ in Equations (3) and the strength q in Equations (9).

Although the embodiment uses the computer, similar processing may be performed on an image processing apparatus capable of capturing an image such as an image storage unit or a printer instead of the computer. As a further alternative, similar processing may be performed on a portable apparatus having an imaging function, such as a digital camera.

[Fourth Embodiment]

A fourth embodiment will be described. This embodiment is an embodiment of an image processing program for automating the magnification distortion correction using a computer. This embodiment is directed to a case of employing magnification distortion correction in which the geometric transformation processing according to the first embodiment and that according to the second embodiment are combined together. It is assumed that a monitor as an output device and a mouse, a keyboard, etc. as input devices are connected to the computer and serve for interfacing with a user.

FIG. 7 is an operation flowchart of the computer according to the embodiment. As shown in FIG. 7, the computer reads an image to be processed (operation S11). At this operation, the computer recognizes a focal length f of a shooting lens, a maximum image height length $d_{max}$, and distortion aberration information by referring to adjunct information of an image file of the image to be processed and a separately prepared database. Among these pieces of information, the distortion aberration information is recognized based on information of lens positions at the time of shooting that is attached to the image file and the database. However, if the distortion aberration information is attached to the image file, it is not necessary to refer to the database.

Then, the computer generates a simplified image for line detection by performing size reduction transformation processing, geometric transformation processing for distortion aberration correction, and pixel interpolation processing in this order on the image to be processed (operation S20), and extracts line information from the simplified image (operation S21). The line information indicates what and how many straight lines exist in the image to be processed. A line information extraction method of operation 521 will be described below.

(Line Information Extraction Method)

First, edges of the simplified image are detected and a binary edge image is generated which consist of edges whose values are larger than or equal to a predetermined threshold value. A Hough image is generated by analyzing the edge image. In generating a Hough image, first, Equation (10) is employed as a line model. The origin of x-y coordinates is the optical axis center.

$$x \cos \theta + y \sin \theta = \rho \tag{10}$$

Then, a $(\theta, \rho)$ combination that satisfies the following Equation (11) is found for edge coordinates $(x_i, y_i)$ in the edge image.

$$x_i \cos \theta + y_i \sin \theta = \rho \tag{11}$$

Then, the thus found $(\theta, \rho)$ are mapped onto the $\theta$-$\rho$ coordinates. The range of $\theta$ is $0 \leq \theta \leq 180°$. The mapping means adding "1" to the pixel value of a pixel corresponding to $(\theta, \rho)$ on the $\theta$-$\rho$ coordinates. The Hough image is an image that is formed finally on the $\theta$-$\rho$ coordinates by repeating the mapping for all pairs of edge coordinates $(x_i, y_i)$ of the edge image.

Then, a normalized Hough image is acquired by normalizing the Hough image and pixels having local maximum pixel values in the normalized Hough image are determined.

Coordinates $(\theta, \rho)$ of each of these pixels indicate a type of straight lines that are included in the image to be processed by a predetermined amount or more. The pixel value H of each of those pixels indicates an amount of each straight line. Therefore, it is appropriate to employ $(\theta, \rho, H)$ of each of those straight lines as line information of the image to be processed. (The description of the line information extraction method ends here).

Then, the computer calculates an amount $A_{H1}$ of straight lines that will be distorted by the geometric transformation processing according to the first embodiment (operation S22) and calculates an amount $A_{H2}$ of straight lines that will be distorted by the geometric transformation processing according to the second embodiment (operation S24) based on the line information.

Straight lines that will be distorted by the geometric transformation processing according to the first embodiment are straight lines that do not pass through the vicinity of the optical axis center and whose p values are larger than a predetermined value (because p represents the distance from the straight line to the optical axis center as seen from Equation (10)). The sum of H values of these straight lines is the amount $A_{H1}$ of straight lines that will be distorted by the geometric transformation processing according to the first embodiment.

Straight lines that will be distorted by the geometric transformation processing according to the second embodiment are straight lines each of which is neither a vertical line nor a horizontal line and whose $\theta$ values are different from 0°, 90°, or 180° by a predetermined value or more (because $\theta$ is the angle formed by the straight line and the y axis as seen from Equation (10)). The sum of H values of these straight lines is the amount $A_{H2}$ of straight lines that will be distorted by the geometric transformation processing according to the second embodiment.

Then, the computer sets the geometric transformation parameter $\theta p$ at a value that is suitable for the amount $A_{H1}$ of straight lines (operation S23). A function $\theta p(A_{H1})$ is a monotonically increasing function in a broad sense; $\theta p$ increases with $A_{H1}$. A manufacturer of the program may properly set the function $\theta p(A_{H1})$ based on experiments or simulations conducted in advance. It is appropriate to set the minimum value of $\theta p$ at about 30°.

The computer sets the geometric transformation parameter q at a value that is suitable for the amount $A_{H2}$ of straight lines (operation S24). A function $q(A_{H2})$ is a monotonically decreasing function in a broad sense; q decreases with $A_{H2}$. A manufacturer of the program may properly set the function $q(A_{H2})$ based on experiments or simulations conducted in advance. It is appropriate to set the maximum value of q at about 0.7.

Then, the computer performs geometric transformation processing for distortion aberration correction using the distortion aberration information, the geometric transformation processing according to the first embodiment using the geometric transformation parameter $\theta p$, the geometric transformation processing according to the second embodiment using the geometric transformation parameter q, and pixel interpolation processing in this order on the image to be processed (detailed image), and completes the magnification distortion correction (operation S26).

Then, if necessary, the computer stores an image obtained by the magnification distortion correction in a nonvolatile memory such as a hard disk in a proper file format (operations S19 and S20).

(Advantages of Fourth Embodiment)

The image processing program according to the fourth embodiment sets the geometric transformation parameters automatically according to the structure of an image to be processed. This saves a user time and labor and thus provides high convenience. Furthermore, the following advantages are provided:

(1) Since the geometric transformation processing for distortion aberration correction is performed on an image to be processed before extraction of line information from the image to be processed, the accuracy of the extraction can be increased.

(2) Since the size reduction transformation processing is performed on an image to be processed before extraction of line information from the image to be processed, the speed of the extraction processing can be increased.

(3) Since Hough transform is used for the extraction of line information, the accuracy of the extraction can be increased.

(4) Since the strength of geometric transformation processing of such a kind that line structures are distorted is set at a proper low level, the line reproducibility can be kept at a high level.

(5) Since the strength of geometric transformation processing of such a kind that line structures are not distorted is set at a proper high level, both of high line reproducibility and a high level of magnification distortion reduction can be attained.

(Supplements to Fourth Embodiment)

In this embodiment, the geometric transformation processing for distortion aberration correction may be omitted in the case where distortion aberration information cannot be acquired. Certain degrees of advantages can be obtained even in such a case.

In this embodiment, the magnification distortion correction is employed in which the geometric transformation processing according to the first embodiment and that according to the second embodiment are combined together. Alternatively, one of the magnification distortion correction according to the first embodiment and that according to the second embodiment may be employed.

Although the embodiment uses the computer, similar processing may be performed on an image processing apparatus capable of capturing an image such as an image storage unit or a printer instead of the computer. As a further alternative, similar processing may be performed on a portable apparatus having an imaging function, such as a digital camera.

(Fifth Embodiment)

A fifth embodiment will be described. This embodiment is an embodiment of an image processing method for performing magnification distortion correction on a shot image through a shooting lens. This embodiment will be described with an assumption that the magnification distortion correction is performed by a computer. It is also assumed that a monitor as an output device and a mouse, a keyboard, etc. as input devices are connected to the computer and serve for interfacing with a user.

The computer executes the following <operation 1> to <operation 4> according to a preinstalled image processing program.

<Operation 1>

As shown in FIG. 8A, an image to be processed is displayed on the monitor. In FIG. 8A, S1 and S2 denote subjects and C1 denotes a crosshairs cursor. The crosshairs cursor C1 points the subject S1 that is located in a central area of the image to be processed.

<Operation 2>

As shown in FIG. 8B, a user is caused to specify a main subject position. FIG. 8B shows a state that the user has moved the crosshairs cursor C1 to specify the subject S2 that is located in a peripheral area of the image to be processed.

<Operation 3>

A virtual optical system is assumed whose optical axis is located at the specified position. For example, the geometric transformation characteristic of the virtual optical system is such as to provide a relationship $h(\theta) \propto \tan \theta$ between the subject angle $\theta$ and the image height h.

The image to be processed is converted into an image that would be obtained when the same subjects were shot by the virtual optical system by performing, on the image to be processed, predetermined geometric transformation processing in which the above geometric transformation characteristic is taken into consideration. Furthermore, pixel interpolation processing is performed on a converted image.

The predetermined geometric transformation processing is a combination of geometric transformation processing whose characteristic is inverse to a geometric transformation characteristic specific to the shooting lens, rotational transformation for converting the optical axis direction of the shooting lens so that it coincides with the optical axis direction of the virtual optical system, and geometric transformation processing whose geometric transformation characteristic is specific to the virtual optical system. Incidentally, where the shooting lens is a general one having a small distortion aberration, the inverse characteristic is given by the above-described Equation (2).

Incidentally, a technique similar to the above geometric transformation processing is disclosed in Japanese Unexamined Patent Application Publication No. H06-121318. However, in this embodiment, the geometric transformation is performed on the entire area of the image to be processed instead of its partial area. In the embodiment, a converted image is trimmed into a rectangular shape if necessary.

<Operation 4>

A processed image is displayed on the monitor. FIG. 8C shows a displayed image. As shown in FIG. 8C, the magnification distortion of the subject S2 in the peripheral area that was designated by the user is reduced. On the other hand, the magnification distortion of the subject S1 in the central area is increased.

(Advantage of Fifth Embodiment)

This embodiment makes it possible to attain magnification distortion reduction and line reproducibility only for a main subject designated by a user in an image to be processed.

(Supplements to Fifth Embodiment)

In this embodiment, a main subject position is specified by a user. Alternatively, a main subject position may be detected automatically in such a manner that the computer performs image recognition processing such as face detection on an image to be processed.

It is desirable that the trimming of the embodiment be such as to leave as wide an area as possible (at least a half area).

Where the image to be processed of the embodiment is a shot image through a shooting lens having a large distortion aberration, it is appropriate to acquire distortion aberration information of the shooting lens in advance and incorporate geometric transformation processing (for distortion aberration correction) for converting the image height h based on the distortion aberration information into the above-described predetermined geometric transformation processing.

Although the embodiment uses the computer, similar processing may be performed on an image processing apparatus capable of capturing an image such as an image storage unit or a printer instead of the computer. As a further alternative, similar processing may be performed on a portable apparatus having an imaging function, such as a digital camera.

The many features and advantages of the embodiments are apparent from the detailed specification and, thus, it is intended by the appended claims to cover all such features and advantages of the embodiments that fall within the true spirit and scope thereof.

Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing method which performs predetermined geometric transformation processing on an image, wherein:

said predetermined geometric transformation processing includes geometric transformation processing for magnification distortion reduction that reduces a discrepancy between a circumferential magnification and a radial magnification of said image; and at least one parameter that determines one of strength and content of said geometric transformation processing for said magnification distortion reduction is set according to a structure of said image.

2. The image processing method according to claim 1, wherein
said geometric transformation processing for said magnification distortion reduction acts on a peripheral area of said image.

3. The image processing method according to claim 2, wherein
said predetermined geometric transformation processing includes geometric transformation processing for magnification distortion reduction that acts on the peripheral area of said image and geometric transformation processing for line reproduction that acts on a central area of said image.

4. The image processing method according to claim 3, wherein
a position of a boundary between said peripheral area and said central area is set as said parameter.

5. The image processing method according to claim 4, wherein
at least one of $h(\theta)$, $h'(\theta)$ as derivatives of $h(\theta)$, and $\kappa(\theta)$ is continuous at $\theta p$, when $\theta$ is an arbitrary subject angle,
$\theta p$ is a subject angle corresponding to said boundary position,
$h(\theta)$ is an image height, as a function of said subject angle $\theta$, obtained after execution of said predetermined geometric transformation processing, and
$\kappa(\theta)$ is a ratio between the circumferential magnification and the radial magnification at said subject angle $\theta$.

6. The image processing method according to claim 1, wherein
said image has magnification distortion that is symmetrical with respect to an optical axis center, said geometric transformation processing for said magnification distortion reduction has a geometric transformation characteristic that is not symmetrical with respect to the optical axis center, and strength q of said geometric transformation processing for magnification distortion reduction is set as said parameter.

7. The image processing method according to claim 6, wherein
said strength q is set in a range of 0<q<1.

8. The image processing method according to claim 6, wherein
said geometric transformation processing for said magnification distortion reduction has a geometric transformation characteristic that is symmetrical with respect to a vertical line and a horizontal line that pass through said optical axis center.

9. The image processing method according to claim 1, further comprising displaying images obtained at least one of before and after execution of said predetermined geometric transformation processing to a user and letting the user set said parameter.

10. The image processing method according to claim 1, further comprising performing line detection on said image and setting said parameter according to a result of performing the line detection.

11. The image processing method according to claim 1, wherein
said geometric transformation processing for said magnification distortion reduction is geometric transformation processing for converting said image into an image that may be obtained when the same subject is shot by a virtual optical system whose optical axis is located at a position that is deviated from a center of said image, and said optical axis position of said virtual optical system is set as said parameter.

12. The image processing method according to claim 11, wherein
said position of the optical axis of said virtual optical system is set at a main subject position in said image.

13. The image processing method according to claim 12, further comprising displaying said image to a user to let the user specify said main subject position.

14. The image processing method according to claim 12, further comprising performing image recognition on said image and detecting said main subject position based on a result of performing said image recognition.

15. The image processing method according to claim 1, wherein:
said predetermined geometric transformation processing includes geometric transformation processing for distortion aberration reduction for reducing distortion aberration of said image in addition to said geometric transformation processing for magnification distortion reduction; and
pixel interpolation processing is performed at one time on the image that has been subjected to both of said geometric transformation processing for said magnification distortion reduction and said geometric transformation processing for said distortion aberration reduction.

16. A non-transitory computer readable storage medium storing a computer executable program having instructions for performing image processing on an image when the instructions are executed by a computer, the program comprising:
instructions for performing predetermined geometric transformation processing on the image, wherein:
said predetermined geometric transformation processing includes geometric transformation processing for magnification distortion reduction that reduces a discrepancy between a circumferential magnification and a radial magnification of said image; and
at least one parameter that determines one of strength and content of said geometric transformation processing for said magnification distortion reduction is set according to a structure of said image.

17. The non-transitory computer readable storage medium according to claim 16, wherein said geometric transformation processing for said magnification distortion reduction acts on a peripheral area of said image.

18. The non-transitory computer readable storage medium according to claim 16, the program further comprising:
instructions for displaying images obtained at least one of before and after execution of said predetermined geometric transformation processing to a user and letting the user set said parameter.

19. The non-transitory computer readable storage medium according to claim 16, the program further comprising:
instructions for performing line detection on said image; and
instructions for setting said parameter according to a result of performing the line detection.

20. An image processing apparatus comprising at least one processor configured to perform predetermined geometric transformation processing on an image wherein:
said predetermined geometric transformation processing includes geometric transformation processing for magnification distortion reduction that reduces a discrepancy between a circumferential magnification and a radial magnification of said image; and
said processor is configured to set, according to a structure of said image, at least one parameter that determines one of strength and content of said geometric transformation processing for said magnification distortion reduction.

* * * * *